United States Patent [19]
Wohlrab

[11] 3,970,386
[45] July 20, 1976

[54] BIDIRECTIONAL TRANSPORT OF SPROCKETED FILM

[75] Inventor: Hans Chr. Wohlrab, North Hollywood, Calif.

[73] Assignee: PSC Technology, Inc., Glendale, Calif.

[22] Filed: Mar. 17, 1975

[21] Appl. No.: 559,008

[52] U.S. Cl. .................................. 355/111; 226/2; 226/49; 355/132
[51] Int. Cl.² ........................................ G03B 27/10
[58] Field of Search ........ 355/97, 104, 90, 108–111, 355/132; 226/2, 49–51

[56] References Cited
UNITED STATES PATENTS

| | | | |
|---|---|---|---|
| 2,205,540 | 6/1940 | Phillimore | 355/111 X |
| 2,933,031 | 4/1960 | Friedel | 355/111 |
| 3,382,787 | 5/1968 | Jeffee et al. | 355/111 |

Primary Examiner—RL Moses
Attorney, Agent, or Firm—Christie, Parker & Hale

[57] ABSTRACT

In a bidirectional continuous contact printer for sprocketed film, sprocket holes in a raw film and a master film engage teeth in a sprocket wheel located at an exposure aperture. Between one storage reel and the sprocket wheel, the raw film and the master film pass over tensioning means that draw one edge of the sprocket holes of the raw film and the master film that engage the teeth of the sprocket wheel against such teeth to align the sprocket holes of the films. The tensioning means draw the same edge of the sprocket holes against the teeth in the sprocket wheel during both directions of film transport. In one direction of film transport, the sprocket wheel pulls the film past the exposure aperture, and in the other direction of film transport, the tensioning means pull the film past the exposure aperture. In both directions of film transport, the relative film position is controlled well enough to meet high quality film printing standards.

11 Claims, 5 Drawing Figures

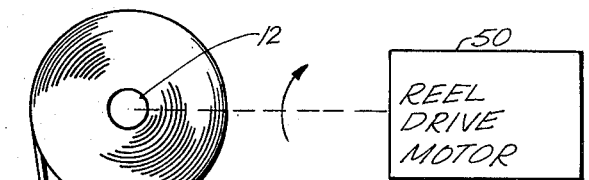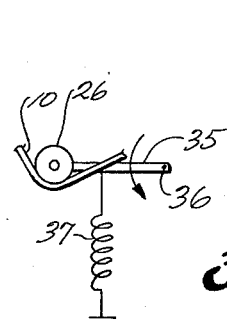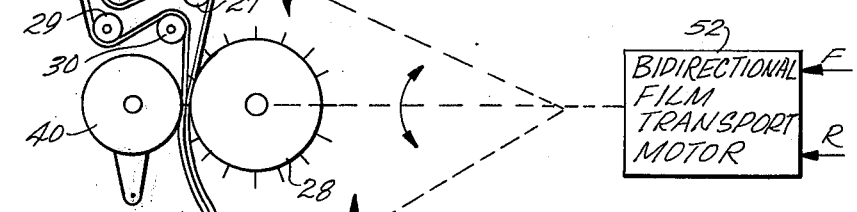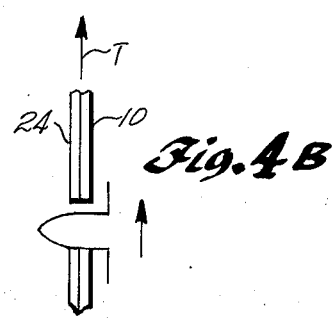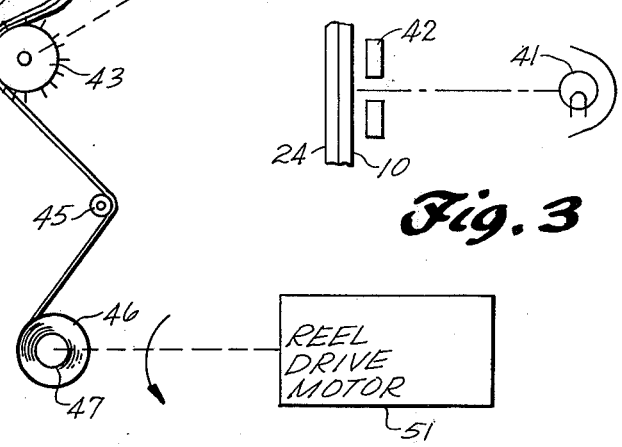

BIDIRECTIONAL TRANSPORT OF SPROCKETED FILM

BACKGROUND OF THE INVENTION

This invention relates to bidirectional transport of sprocketed film and, more particularly, to a method and apparatus for contact film printing which meets high quality standards.

Contact film printers are employed to expose a roll of sprocketed raw film to the frames of photographic images on a roll of sprocketed master film while the master film and raw film are transported continuously together in contact.

In a bidirectional continuous contact printer, the sprocket holes of the raw film and master film engage teeth in a main sprocket wheel located at the exposure aperture. To maintain precise control over the position of the sprocket holes of the master film and raw film during the exposure process, the raw film and master film pass over tensioning means, such as an auxiliary sprocket wheel and a tensioning arm, before reaching the sprocket wheel. The tensioning means draw the leading edges of the sprocket holes in the films that engage the teeth in the main sprocket wheel against such teeth, thereby precisely aligning the sprocket holes of the raw film and the master film during exposure. As a result, the main sprocket wheel pulls the films past the exposure aperture as it rotates. The edges of each tooth of the sprocket wheel against which the leading edges of the sprocket holes are drawn must be polished to provide a smooth, even surface.

conventionally, in a bidirectional continuous contact printer, two tensioning means are provided so, that for both directions of film transport, the leading edges of the sprocket holes of the films that engage the teeth of the main sprocket wheel are drawn against such teeth, and the main sprocket wheel pulls the films past the exposure aperture as it rotates in both directions. Both edges of each tooth must be polished to provide a smooth even surface.

SUMMARY OF THE INVENTION

The invention is based upon the discovery that a single film tensioning means provides precise control over the position of the raw film and the master film in a contact printer for both directions of film transport. Consequently, a unidirectional film printer having only one tensioning means can be converted to a high quality bidirectional printer without redesigning the film guiding system, by simply substituting a suitable bidirectional film transport motor for the original motor and reel drive motors for the friction drag brakes on the supply reels. Further, only one edge of each tooth of the main sprocket wheel needs to be polished.

In the preferred embodiment of the invention, a main sprocket wheel located at an operating station, i.e., an exposure aperture of a contact printer, has teeth that engage sprocket holes in a film or films to be operated upon, i.e., a raw film to be exposed and a master film with images. The main sprocket wheel is selectively driven in either of two directions of film transport. Tension is exerted on the film between one storage reel and the main sprocket wheel, i.e., by an auxiliary sprocket wheel and tensioning arms, to draw the same edge of the sprocket holes that engage the teeth on the main sprocket wheel against such teeth in both directions of film transport. In one direction of film transport, i.e., the direction opposite to the direction of the tension exerted on the film, the teeth of the main sprocket wheel pull the film past the operating station. In the other direction of film transport, i.e., the same direction as the tension exerted on the film, the exerted tension pulls the film past the operating station. In both cases, the position of the film relative to the teeth of the sprocket wheel is precisely controlled, i.e., the sprocket holes of the raw film and master film are aligned as they pass the exposure aperture.

BRIEF DESCRIPTION OF THE DRAWING

The features of a specific embodiment of the best mode contemplated of carrying out the invention are illustrated in the drawing, in which:

FIG. 1 is a schematic diagram of the film path in a continuous contact film printer;

FIG. 2 is a schematic diagram of one of the tensioning arms in FIG. 1;

FIG. 3 is a schematic diagram of the apparatus for exposing the film in the printer of FIG. 1; and FIGS. 4A and 4B are diagrams depicting the engagement of the teeth of the main sprocket wheel in FIG. 1 with the sprocket holes of the raw film and the master film during forward and reverse film transport, respectively.

DETAILED DESCRIPTION OF THE SPECIFIC EMBODIMENT

For the purpose of discussion, the transport of film from top to bottom of FIG. 1 will be designated hereafter as the forward direction of film transport. A roll of sprocketed master film 10 having frames of photographic images to be copied is stored on a film storage reel 11 mounted on a hub 12. Film 10 is guided to an auxiliary sprocket wheel 14 by stationary flanged guide rollers 15, 16, and 17. At guide rollers 15 and 16, master film 10 passes film cleaners 22 and 23, respectively, which could be conventional vacuum-type cleaners. At guide roller 17, master film 10 comes into contact with a sprocketed raw film 24 on which the frames of master film 10 are to be copied. Raw film 24 could be stored on another film storage reel, not shown. The sprocket holes of raw film 24 and master film 10 are maintained in engagement with the teeth of sprocket wheel 14 by a guide roller 25, which is mounted on a pivot arm spring-biased in a clockwise direction, as viewed in the drawing. Master film 10 is guided by a guide roller 26 mounted on a tensioning arm and a stationary flanged guide roller 27 to a main sprocket wheel 28. Raw film 24 is guided by a guide roller 29 mounted on a tensioning arm and a stationary flanged guide roller 30 to main sprocket wheel 28. The tensioning arms for guide rollers 26 and 29 are identical in construction.

A typical tensioning arm for guide roller 26 is depicted in FIG. 2. Guide roller 26 is rotatably mounted on one end of a tensioning arm 35. The other end of tensioning arm 35 has a pivotable connection 36 to the frame of the film printer. A compression spring 37 is connected between tensioning arm 35 and the frame of the printer to bias tensioning arm 35 in a counterclockwise direction, as viewed in the drawing.

A roller 40 is mounted on a pivot arm spring-biased in a clockwise direction, as viewed in the drawing, to maintain the sprocket holes of raw film 24 and master film 10 in engagement with the teeth of main sprocket wheel 28. Sprocket wheel 14 and the tensioning arms on which guide rollers 26 and 29 are mounted exert tension on master film 10 and raw film 24, respectively, thereby drawing master film 10 and raw film 24 toward guide rollers 26 and 29 until the leading edges of the sprocket holes of master film 10 and raw film 24 in engagement with the teeth of sprocket wheel 28 abut against the adjacent surface of such teeth, which is polished, and the trailing edges of the sprocket holes of master film 10 and raw film 24 in engagement with the teeth of sprocket wheel 28 abut against the surface of such teeth. The tensioning arms provide the compliance necessary to compensate for slight variations in sprocket hole size and the speed of sprocket wheel 14. These tensioning means, i.e., sprocket wheel 14 and the tensioning arms, serve to precisely align the sprocket holes of raw film 24 with the sprocket holes of master film 10 so as to insure that the frames of the photographic images are uniformly positioned on film 24 relative to its sprocket holes.

Main sprocket wheel 28 is located at the film exposure apparatus, which is represented in FIG. 3, so the sprocket holes of master film 10 and raw film 24 engage the teeth of sprocket wheel 28 during exposure. Light from a lamp 41, which would be located in the same plane as and to the right of sprocket wheel 28, as viewed in the drawing, is directed through an opening in sprocket wheel 28 and an exposure aperture 42, located at sprocket wheel 28, onto the surface of master film 10. Sprocket wheel 28 is constructed so it does not block the passage of light through exposure aperture 42. Preferably, roller 40 is constructed of resilient black rubber. In addition to maintaining the sprocket holes in engagement with the teeth of sprocket wheel 28, roller 40 then serves as a backing to raw film 24 to prevent light from escaping to the surroundings. Roller 40 and sprocket wheel 28 have been omitted in FIG. 3 to simplify the illustration of the exposure apparatus. The spring bias of roller 40 is not so great as to prevent master film 10 and raw film 24 from being drawn toward guide rollers 26 and 29, respectively; otherwise, the aligning function of the tensioning means would be impaired.

Master film 10 and film 24 pass in contact with each other from main sprocket wheel 28 to an auxiliary sprocket wheel 43. A loop is formed in the film path to permit compliance of and remove tension from master film 10 and film 24. A pivotably mounted guide roller 44 is spring-biased in a clockwise direction, as viewed in the drawing, to maintain the sprocket holes of master film 10 and film 24 in engagement with the teeth of auxiliary sprocket wheel 43. From sprocket wheel 43, master film 10 passes over a stationary flanged guide roller 45 to a takeup reel 46, which is mounted on a hub 47. From sprocket wheel 43, film 24 moves out of contact with master film 10 and could be guided to a takeup reel, not shown.

The apparatus as described to this point is a conventional unidirectional continuous contact film printer, when hub 12 is provided with a friction drag brake, hub 47 is provided with a torque motor, and sprocket wheels 14, 28, and 43 are provided with a unidirectional motor to transport the master film and raw film past the exposure aperture in only one direction of film transport; indeed, this apparatus represents the Bell & Howell, Model C Contact Printer. The invention permits this apparatus to be converted to a bidirectional printer by substituting a torque motor for the friction drag brake of hub 12 and a bidirectional motor for the unidirectional film drive motor. Thus, a reel drive motor 50 is coupled to hub 12, a reel drive motor 51 is coupled to a hub 47, and a bidirectional film transport motor 52 is coupled to sprocket wheels 14, 28, and 43 through appropriate gearing such that the tangential velocity of these sprocket wheels is identical. Motors 50 and 51 are preferably torque motors, i.e., motors that exert a constant torque on their respective hubs. It is not necessary to polish the other edge of each tooth of sprocket wheel 28, because it does not serve an aligning or indexing function.

To commence film transport in the forward direction, i.e., from reel 11 to reel 46, a lead F on motor 52 is energized. As depicted in FIG. 4A, during film transport in the forward direction, the tensioning arms of guide rollers 26 and 29 draw the leading edges of the sprocket holes of master film 10 and raw film 24 that engage the teeth of main sprocket wheel 28 against such teeth, thereby indexing, i.e., positioning, master film 10 and raw film 24 relative to each other and relative to the teeth on sprocket wheel 28. As sprocket wheel 28 rotates in the counterclockwise direction, as viewed in the drawing, during forward film transport, the teeth of sprocket wheel 28, being in contact with the leading edges of the respective sprocket holes, pull master film 10 and raw film 24 past exposure aperture 42 with their sprocket holes in alignment. Motor 50 exerts a drag on hub 12 so the film between reel 11 and sprocket wheel 14 remains in tension, and motor 51 rotates hub 47 at a sufficient speed to take up the film fed to it by sprocket wheel 43.

To commence film transport in the reverse direction, i.e., from reel 46 to reel 11, a lead R on motor 52 is energized. As depicted in FIG. 4B, during film transport in the reverse direction, the tensioning arms of guide rollers 26 and 29 draw the trailing edges of the sprocket holes of master film 10 and raw film 24 that engage the teeth of main sprocket wheel 28 against such teeth, thereby indexing, i.e., positioning, master film 10 and raw film 24 relative to each other and relative to the teeth on sprocket wheel 28. As sprocket wheel 28 rotates in the clockwise direction, as viewed in the drawing, during reverse film transport, the tension means pull master film 10 and raw film 24 past exposure aperture 42 with their sprocket holes in alignment. Specifically, the tensioning arms draw the leading edges of the sprocket holes of master film 10 and raw film 24 in engagement with the teeth of sprocket wheel 14 against such teeth. As sprocket wheel 14 rotates in the clockwise direction, as viewed in the drawing, during reverse film transport, the teeth of sprocket wheel 14, being in contact with the leading edges of the respective sprocket holes, pull master film 10 and raw film 24 past exposure aperture 42. Motor 51 exerts a drag on hub 47, so the film between reel 46 and sprocket wheel 43 remains in tension, and motor 50 rotates hub 12 at a sufficient speed to take up the film fed to it by sprocket wheel 14.

In summary, during both directions of film transport, the tensioning arms and the teeth on sprocket wheel 28 serve to control the position of the master film and raw film as they pass the exposure aperture; during forward film transport, sprocket wheel 28 pulls the films past the exposure aperture and during reverse film transport the tensioning means pull the films past the exposure aperture.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention.

What is claimed is:

1. A method for transporting film having sprocket holes along a film path that passes an operating station with a sprocket wheel having teeth that engage the sprocket holes, the method comprising the steps of:
   guiding the film along the film path extending from one direction of the sprocket wheel;
   guiding the film along the film path extending from the other direction of the sprocket wheel;
   exerting tension on the film along the film path extending from only one direction of the sprocket wheel to draw one edge of the sprocket holes that engage the teeth against the teeth so as to index the film relative to the sprocket wheel;
   selectively rotating the sprocket wheel in the direction opposite to the tension exerted on the film by the exerting step so the sprocket wheel pulls the film past the operating station; and
   rotating the sprocket wheel in the same direction as the tension exerted on the film by the tension exerting step so the tension pulls the film past the operation station.

2. The method of claim 1, in which the film is raw, i.e., unexposed film, additionally comprising the steps of:
   guiding a master film having sprocket holes along a film path extending from one direction of the sprocket wheel to engage the sprocket holes of the master film with the teeth of the sprocket wheel, the master film having frames of photographic images to be copied;
   guiding the master film along a film path extending from the other direction of the sprocket wheel to engage the sprocket holes of the master film with the teeth of the sprocket wheel;
   exerting tension on the master film along the film path extending from only the one direction of the sprocket wheel to draw one edge of the sprocket holes of the master film that engage the teeth against such teeth so as to align the sprocket holes of the master film and the raw film; and
   passing light through the master film onto the raw film to expose the raw film to the frames of the master film at the operating station.

3. Film handling apparatus having an operating station past which sprocketed film is driven, a sprocket wheel with teeth that engage sprocket holes in the film, means for driving the sprocket wheel in one direction of rotation to transport the film past the operating station, and tensioning means over which the film passes before it reaches the sprocket wheel during transport to draw the film in the direction opposite to the direction of transport so as to index the film relative to the operating station while the sprocket wheel pulls the film past the operating station, the improvement comprising means for driving the sprocket wheel to transport the film in the direction opposite the one direction so the tensioning means pulls the film past the operating station.

4. A bidirectional contact film printer for exposing a roll of sprocketed raw film to the frames of photographic images on a roll of sprocketed master film, the apparatus comprising:
   an exposure aperture at which the raw film is exposed to the frames of photographic images on the master film;
   a sprocket wheel at the exposure aperture, the sprocket wheel having teeth that engage sprocket holes in the raw film and the master film;
   means for selectively driving the sprocket wheel in a forward direction of film transport or a reverse direction of film transport;
   first means for guiding the raw film and the master film up to the sprocket wheel from one direction;
   second means for guiding the raw film and the master film up to the sprocket wheel from the other direction, the first and second film guiding means bringing the raw film and the master film into contact at the exposure aperture; and
   means for tensioning the raw film and the master film only on one side of the sprocket wheel to draw one edge of the sprocket holes that engage the teeth on the sprocket wheel against the teeth, the same edge of the sprocket holes that engage the teeth being drawn against the teeth on the sprocket wheel in both directions of film transport such that the sprocket wheel pulls the raw film and master film past the exposure aperture in one direction of film transport and the tensioning means pulls the raw film and master film past the exposure aperture in the other direction of film transport.

5. The apparatus of claim 4, in which the tensioning means includes a first pivotable spring loaded film tensioning arm having a guide roller over which the raw film passes and a second pivotable spring loaded film tensioning arm having a guide roller over which the master film passes.

6. The apparatus of claim 5, in which the tensioning means further includes an additional sprocket wheel having teeth that engage sprocket holes in the raw film and the master film arranged such that the tensioning arms are between the sprocket wheel at the exposure aperture and the additional sprocket wheel in the path of the raw film and the master film, the driving means driving the additional sprocket wheel in synchronism and in the same selective direction of film transport as the sprocket wheel at the exposure aperture.

7. The apparatus of claim 5, in which the first film guiding means includes at least one film storage reel and the tensioning means further includes an additional sprocket wheel having teeth that engage the sprocket holes on the raw film and master film arranged such that the tensioning arms are between the sprocket wheel at the exposure aperture and the additional sprocket wheel in the path of the raw film and the master film, the driving means driving the additional sprocket wheel in synchronism and in the same selective direction of film transport as the sprocket wheel at the exposure aperture.

8. The apparatus of claim 5, in which the first film guiding means includes at least one film storage reel, the tensioning means further includes an additional sprocket wheel having teeth that engage the sprocket holes on the raw film and master film arranged such that the tensioning arms are between the sprocket wheel at the exposure aperture and the additional sprocket wheel in the path of the raw film and the master film, and the second film guiding means includes at least one film storage reel and an additional sprocket wheel arranged in the path of the raw film and master film between such reel and the sprocket wheel at the exposure aperture, the driving means driving the additional sprocket wheels in synchronism and in the same selective direction of film transport as the sprocket wheel at the exposure aperture.

9. The apparatus of claim 4, in which the tensioning means further includes an additional sprocket wheel having teeth that engage sprocket holes in the raw film and the master film arranged such that the tensioning means are between the sprocket wheel at the exposure aperture and the additional sprocket wheel in the path of the raw film and the master film, the driving means driving the additional sprocket wheels in synchronism and the same selective direction of film transport as the sprocket wheel at the exposure aperture.

10. The apparatus of claim 4, in which the first film guiding means includes at least one film storage reel and the tensioning means further includes an additional sprocket wheel having teeth that engage the sprocket holes on the raw film and the master film arranged such that the tensioning means are between the sprocket wheel at the exposure aperture and the additional sprocket wheel in the path of the raw film and the master film, the driving means driving the additional sprocket wheels in synchronism and the same selective direction of film transport as the sprocket wheel at the exposure aperture.

11. The apparatus of claim 4, in which the first film guiding means includes at least one film storage reel, the tensioning means further includes an additional sprocket wheel having teeth that engage the sprocket holes on the raw film and master film arranged such that the tensioning means are between the sprocket wheel at the exposure aperture and the additional sprocket wheel in the path of the raw film and the master film, and the second film guiding means includes at least one film storage reel and an additional sprocket wheel arranged in the path of the raw film and master film between such reel and the sprocket wheel at the exposure aperture, the driving means driving the additional sprocket wheels in synchronism and in the same selective direction of film transport as the sprocket wheel at the exposure aperture.

* * * * *